United States Patent
Beraud et al.

(10) Patent No.: US 9,702,066 B2
(45) Date of Patent: Jul. 11, 2017

(54) COMPOSITE MATERIAL HAVING AT LEAST ONE TWISTED THREAD DEPOSITED THEREIN

(71) Applicant: Hexcel Reinforcements, S.A.S., Dublin, CA (US)

(72) Inventors: Jean-Marc Beraud, Rives (FR); Alain Bruyere, Les Avenieres (FR)

(73) Assignee: Hexcel Reinforcements, S.A.S., Les Avenieres (FR)

( * ) Notice: Subject to any disclaimer, the term of this patent is extended or adjusted under 35 U.S.C. 154(b) by 686 days.

(21) Appl. No.: 14/188,858

(22) Filed: Feb. 25, 2014

(65) Prior Publication Data

US 2014/0165529 A1 Jun. 19, 2014

Related U.S. Application Data

(62) Division of application No. 12/602,683, filed as application No. PCT/FR2008/051035 on Jun. 10, 2008, now Pat. No. 8,696,850.

(30) Foreign Application Priority Data

Jun. 12, 2007 (FR) .................................... 07 55680
Jul. 16, 2007 (FR) .................................... 07 56503

(51) Int. Cl.
*D02G 3/40* (2006.01)
*D02G 3/02* (2006.01)
*D02G 3/26* (2006.01)
*B29B 11/16* (2006.01)
*B29C 70/38* (2006.01)
(Continued)

(52) U.S. Cl.
CPC ............... *D02G 3/40* (2013.01); *B29B 11/16* (2013.01); *B29C 70/382* (2013.01); *B29C 70/54* (2013.01); *D02G 3/02* (2013.01); *D02G 3/26* (2013.01); *B29K 2105/10* (2013.01); *B29K 2707/04* (2013.01); *Y10T 428/249942* (2015.04);
(Continued)

(58) Field of Classification Search
CPC ..... B29C 53/083; B29C 70/382; B29C 70/54; B29L 2031/06; B29K 2707/04; D02G 3/26; D02G 3/40; Y10T 428/249942
USPC .......................................... 264/339; 425/329
See application file for complete search history.

(56) References Cited

U.S. PATENT DOCUMENTS

| 4,137,354 A | 1/1979 | Mayes et al. |
| 4,272,950 A | 6/1981 | Bompard |

(Continued)

FOREIGN PATENT DOCUMENTS

| EP | 1136216 A | 9/2001 |
| EP | 1469113 A | 10/2004 |

(Continued)

*Primary Examiner* — Camie Thompson
(74) *Attorney, Agent, or Firm* — W. Mark Bielawski; David J. Oldenkamp

(57) ABSTRACT

The invention relates to a composite material in which at least one reinforcement thread is deposited on a surface according to a path having at least one curved area on the deposition surface, wherein the reinforcement thread is connected to the surface by a polymeric binder. A twist is applied to the reinforcement thread before the deposition thereof at least in order to compensate the length differences of the extreme paths of the thread on either side of the width as measured in a direction parallel to the deposition surface.

19 Claims, 4 Drawing Sheets

(51) Int. Cl.
    *B29C 70/54*     (2006.01)
    *B29K 105/10*     (2006.01)
    *B29K 707/04*     (2006.01)

(52) U.S. Cl.
    CPC ............... *Y10T 428/249946* (2015.04); *Y10T 428/2907* (2015.01)

(56) References Cited

U.S. PATENT DOCUMENTS

| | | |
|---|---|---|
| 5,080,851 A | 1/1992 | Flonc et al. |
| 5,326,524 A | 7/1994 | Rhodes, Jr. et al. |
| 7,115,180 B2 | 10/2006 | Bruyere |
| 2007/0023139 A1 | 2/2007 | Bruyere |
| 2007/0193246 A1* | 8/2007 | Schneider ............... D02G 3/46 57/236 |

FOREIGN PATENT DOCUMENTS

| | | |
|---|---|---|
| FR | 2889104 A | 2/2007 |
| JP | H0I-235612 A | 9/1989 |
| JP | H0I-261810 A | 9/1992 |
| WO | 2009/108199 A1 | 9/2009 |

\* cited by examiner

COMPOSITE MATERIAL HAVING AT LEAST ONE TWISTED THREAD DEPOSITED THEREIN

This application is a divisional of co-pending U.S. application Ser. No. 12/602,683, which was filed on Dec. 2, 2009, which is a 371 of PCT/FR2008/051035, which was filed on Jun. 10, 2008.

The invention concerns the technical field of composite preforms. The subject of the invention is a deposition process of at least one thread particularly adapted to the creation of preforms at least one part of which is curved, typically annular or ellipsoidal. The invention is notably applied for the composite parts used in the automobile, aviation or naval industry.

The fabrication of composite parts or goods, that is, containing on one hand one or several fibrous reinforcements, and on the other hand, a matrix of a typically thermoplastic or thermosetting resin or a mixture of the two, can for instance be obtained by a process called "direct" or by a process called "indirect." A direct process is defined by the fact that one or several fiber reinforcements are prepared in a "dry" state (that is without the final matrix), the typically thermoplastic or thermosetting resin or matrix, or a mixture of the two, being prepared separately, for instance by injection into the mold containing the reinforcement fibers ("RTM" process, from the English Resin Transfer Molding), by infusion (into a mold, through the thickness of the reinforcement fibers: "LRI" process, from the English Liquid Resin Infusion or "RFI" process, from the English Resin Film Infusion), or else by manual coating/impregnation with a roller or brush on each of the unit layers of fibrous reinforcement, applied successively on the mold. An indirect process is defined by the fact that the fibers and the resin are first associated before being prepared and the prepared fiber reinforcements are called preimpregnated.

For the RTM, LRI or RFI processes, it is generally first, necessary to build a fibrous preform in the form of the desired finished product, then to impregnate this preform with a thermoplastic or thermosetting resin, or a mixture of the two. The resin is injected or infused by pressure differential then thermocompressed to harden it after polymerization. In the fiber reinforcements adapted to direct processes, the reinforcement threads are generally associated to confer a unitary character to the part, then called preform, by adhesion with a polymeric binder whose weight percentage with respect to the total weight of the fiber reinforcement (that is, reinforcement threads+polymeric binder) varies from 0.1 to 25%, and advantageously from 3 to 10%. In the case of preimpregnates adapted to indirect processes, the binder itself represents 20 to 60%, preferably 30 to 40% of the total weight of fibrous reinforcement (that is, reinforcement threads+polymeric, binder).

The composite parts used in the automobile, aviation or naval industry are particularly subjected to very strict requirements of mechanical properties.

For applications in the aviation, aerospace, or automotive field, notably, it is sometimes necessary to have preforms, at least one part of which is intended to constitute the contour of an opening typically annular or ellipsoidal for instance, as in the case of frames, portholes, nozzles, jet inlets, or any type of reinforcement element intended to be placed around an opening or to serve as reinforcement for punched-out parts, such as bores, reinforcement elements for connecting rods, door corner frames, porthole or windshield reinforcements, manholes.

In the composite field, the threads are composed of an assembly of filaments extending essentially parallel to each other. The threads thus have a certain width. As a result, the inventors have noted that on the deposition surface, winch can be plane or not plane, when the threads follow non-rectilinear, and notably curved paths, undulations are observed, leading to a non-homogeneous deposit. The inventors have demonstrated that these undulations were due to the fact that the filaments located at the two extreme paths of the thread had to follow paths of different lengths. The extreme paths designate the two paths followed by the thread on both sides of its width, measured parallel to its deposition surface.

FIG. 1 illustrates this phenomenon in the case of a thread deposited on a plane surface following a path along the arc of a circle. Thread F has a width I measured parallel to the deposition surface. The path T followed by the middle fiber (or median filament) of the thread F is a portion of an arc of a circle with a radius R over an angle $\Theta$. It therefore appears that the length of the path followed by the thread is not the same over its whole width I, with the extreme paths $T_1$ and $T_2$ having different lengths.

Indeed, outside of the arc of a circle, the path $T_2$, named external or maximal, is an arc of a circle with a radius $R_2$ and inside the arc of a circle, the path $T_1$, named internal or minimal, is an arc of a circle with a radius $R_1$. The path $T_1$ thus has a length $L_1$ equal to $\Theta R_1$ and the path $T_2$ a length $L_2$ equal to $\Theta R_2$, $L_2$, being larger than $L_1$. Therefore, at the internal path $T_1$, the filaments, which have no elasticity, have a length $L_1$. Which is in fact equal to the length $L_2$, greater than their path, leading to an undulation phenomenon due to the presence of lengths of filaments outside or inside the deposition plane. Such irregularities are likely to have premature weak points under mechanical stress and thus lead to a drop in the mechanical performance of the obtained part.

In this context, the invention proposes to provide an improved deposition process making it possible to eliminate these disadvantages. The invention concerns a process for making a composite material in which at least one reinforcement thread is deposited on a surface, along a path with at least one curved area on the deposition surface, in which the reinforcement thread is attached to the surface by means of a polymeric binder, characterized in that a twist is applied to the reinforcement thread before its deposition, so as to at least compensate for the length differences of the extreme paths of the thread on both sides of its width measured parallel to the deposition surface.

The process according to the invention has one or the other of the following characteristics or a combination of these characteristics when they are not mutually exclusive:
  the reinforcement thread is dry before its deposition,
  that a twist of 5 to 100 t/m, preferably of 10 to 80 t/m is applied to the deposited twisted reinforcement thread,
  the composite material is produced by the deposition of a single thread with a twist essentially identical over its entire length, or of a group of threads with an essentially identical twist among themselves and over their entire length,
  a carbon thread of 3K and of 200 tex with a twist of 10 to 70 t/m, preferably of 15 to 40 t/m is deposited, notably when the minimum internal radius of the thread path is in the range of 10 to 500 mm. In particular, when the minimum internal radius of the thread path is in the range of 10 to 50 mm, the twist will be greater than 30 t/m and When the internal radius is greater than 50 mm, the twist can be less than or equal to 30 t/m, a carbon thread of 6K and of 223 tex with a twist of 15 to 80 t/m, preferably of 40 to 70 t/m is deposited, notably when the minimum internal radius of the thread path is in the range of 10 to 500 mm. In particular, when the minimum internal radius of the thread path is in the range of 10 to 50 nm, the twist will be greater than 40 t/m and when the internal radius is greater than 50 mm, the twist can be less than or equal to 40 t/m, a carbon thread of 6K and of 400 tex with a twist of 15 to 80 t/m, preferably of 40 to 60 t/m is deposited, notably when the minimum internal radius of the thread path is in the range of 10 to 500 mm. In particular, when the minimum internal radius of the thread path is in the range of 10 to 50 mm, the twist will be greater than 40 t/m and when the internal radius is greater than 50 mm, the twist can be less than or equal to 40 t/m, a carbon thread of 12K and of 446 tex with a twist of 10 to 80 t/m, preferably of 10 to 60 t/m is deposited, notably when the minimum internal radius of the thread path is in the range of 10 to 500 mm. In particular, when the minimum internal radius of the thread path is in the range of 10 to 50 mm, the twist will be greater than 40 t/m and notably less than or equal to 60 t/m and when the internal radius is greater than 50 mm, the twist can be less than or equal to 40 t/m, notably 10 to 40 t/m, a carbon thread of 24K and of 1040 tex with a twist of 10 to 40 t/m, preferably of 10 to 25 t/m is deposited, notably when the minimum internal radius of the thread path is in the range of 20 to 150 mm. In particular, when the minimum internal radius of the thread path is in the range of 20 to 40 mm, the twist will be greater than 20 t/m and when the internal radius is greater than 40 mm, the twist can be less than or equal to 20 t/m, the twist of the deposited thread is either type S or type Z, preferably type S when the deposition is performed on the curved area of the path, in a clockwise direction, the surface on which the reinforcement thread is deposited consists of reinforcement threads deposited during a previous deposition step, the surface on which the reinforcement thread is deposited is a temporary support, subsequently covered with polymeric binder, the polymeric binder is applied on the surface at first, or as the deposition of the reinforcement thread proceeds, the reinforcement thread is associated with the polymeric binder before its deposition, assuring its bond with the surface on which it is deposited, the reinforcement thread is of a material selected among the following materials: carbon, glass, aramid, silica, ceramic, basalt and their mixtures, the polymeric binder includes a thermosetting system, a thermoplastic polymer or a mixture of said polymers, possibly in the form of powder, a self-adhesive or hot-melt resin, the weight percentage of polymeric binder with respect to the total weight of the composite material (that is reinforcement threads+polymeric binder) is in the range of 0.1 to 25%, and advantageously of 3 to 10%, for preforms suitable for direct processes, the composite material is a preimpregnated preform (indirect process), the weight percentage of the polymeric binder with respect to the total weight of the composite material (that is, reinforcement threads+polymeric binder) is in the range of 20 to 60%, and advantageously of 30 to 40%.

Another object of the invention is the composite materials likely to be obtained by the process according to the invention.

In particular, the invention also concerns a composite material comprising at least one reinforcement thread deposited on a surface along a path with at least one curved area on the deposition surface, in which the reinforcement thread is attached to the surface by means of a polymeric binder, characterized in that the reinforcement thread is twisted so as to at least compensate for the length differences of the extreme paths of the thread on both sides of its width measured parallel to the deposition surface.

Advantageously, such a composite material is composed of a single and unique thread or of a group of threads which all have essentially time same composition, width and twist.

Depending on the methods of particular implementations, the composite material is created from:

a single or a group of carbon threads of 3K and of 200 tex with a twist of 10 to 70 t/m, preferably of 15 to 40 t/m, notably when the minimum internal radius of the thread path is in the range of 10 to 500 mm. In particular, when the minimum internal radius of the thread path is in the range of 10 to 50 mm, the twist will be greater than 30 t/m and when the internal radius is greater than 50 mm, the twist can be less than or equal to 30 t/m, a single or a group of carbon threads of 6K and of 223 tex with a twist of 20 to 80 t/m, preferably of 50 to 70 t/m, notably when the minimum internal radius of the thread path is in the range of 10 to 500 min. In particular, when the minimum internal radius of the thread path is in the range of 10 to 50 mm, the twist will be greater than 40 t/m and when the internal radius is greater than 50 mm, the twist can be less than or equal to 40 t/m, a single or a group of carbon threads of 6K and of 400 tex with a twist of 20 to 80 t/m, preferably of 40 to 60 t/m, notably when the minimum internal radius of the thread path is in the range of 10 to 500 mm. In particular, when the minimum internal radius of the thread path is in the range of 10 to 500 mm, the twist will be greater than 40 t/m and when the internal radius is greater than 50 mm, the twist can be less than or equal to 40 t/m, a single or a group of carbon threads of 12K and of 446 tex with a twist of 10 to 80 t/m, preferably of 10 to 60 t/m, notably when the minimum internal radius of the thread path is in the range of 10 to 500 mm. In particular, when the minimum internal radius of the thread path is in the range of 10 to 50 mm, the twist will be greater than 40 t/m and notably less than or equal to 60 t/m and when the internal radius is greater than 50 mm, the twist can be less than or equal to 40 t/m, notably 10 to 40 t/m, a single or a group of carbon threads of 24K and of 1040 tex with a twist of 10 to 40 t/m, preferably of 10 to 25 t/m, is deposited, notably when the minimum internal radius of the thread path is in the range of 20 to 150 mm. In particular, when the minimum internal radius of the thread path is in the range of 20 to 40 mm, the twist will be greater than 20 t/m and when the internal radius is greater than 40 mm, the twist can be less than or equal to 20 t/m.

The following, description, with reference to the appended figures, makes it possible to better understand the invention:

According to another particular method of implementation, this composite material is produced from a single or a group of reinforcement threads whose twist is either type S or type Z, preferably type S when the deposition is performed on the curved area of the path, in a clockwise direction. For the definitions of what is understood by type S or Z twist, refer to the publication "Handbook of Weaving", p 16-17 by Sabit Adanur, Professor, Department of Textile Engineering, Auburn, USA, ISBN 1-58716-013-7.

In particular, this composite material is composed of a single twisted thread deposited edge to edge along paths essentially parallel to each other (except for bunching points) or of a group of twisted threads deposited essentially parallel to each other and joined together. As a function of the possibilities allowed by the grammage, the count and the twist of the threads being used, the threads are positioned to minimize and even avoid the presence of openings between two neighboring threads. An example of such an implementation is for instance schematically illustrated in FIG. 3. According to an example of implementation, a thread is deposited so as to form a spiral of twisted threads, each turn being deposited edge to edge with the next. An example of such an implementation is for instance schematically illustrated in FIG. 4. Such composite materials can be obtained by deposition of twisted threads on a non-plane surface, or preferably, on a plane surface.

Figure 1:
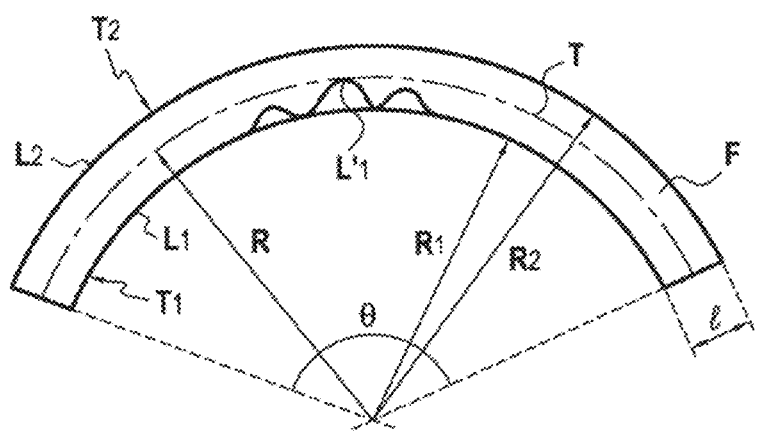
FIG. 1 shows a schematic of the undulation phenomenon observed for the case of the deposition of a non-twisted thread on a surface, along a path on a deposition surface, said path with at least one curved zone on the deposition surface.
Figure 2A:
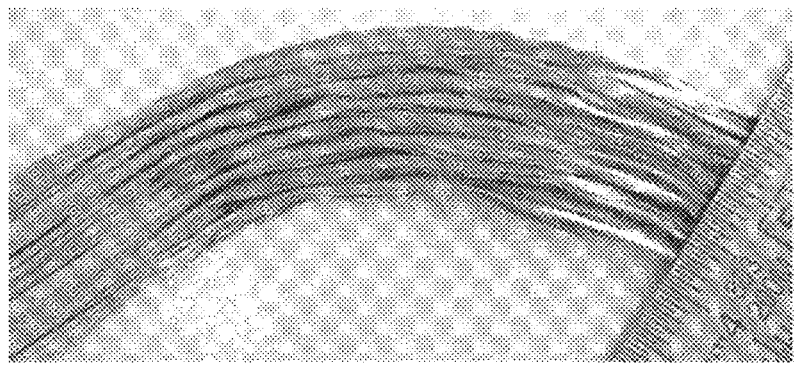
FIG. 2B is a photo of a ply of a web of twisted threads, FIG. 2A being a photo of a similar ply for the case of non-twisted threads.
Figure 2B:
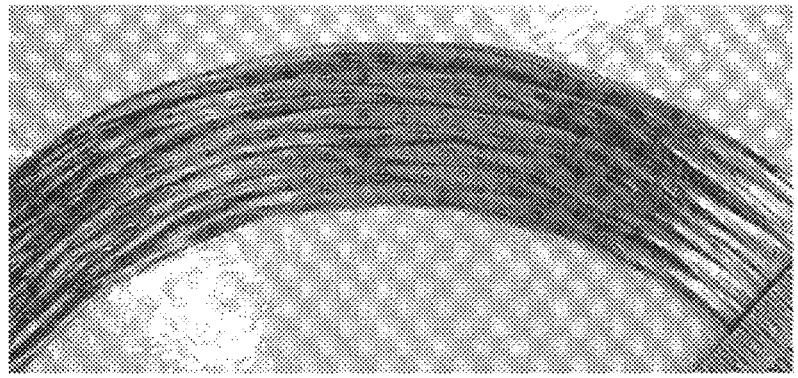

In the context of the invention, a thread is used to which a twist has been applied, that is, a relative rotation of the external edges of the thread, around its middle fiber, such that their path follows a helix, that is, such that the tangent at each point makes an essentially constant angle with a given direction. Each thread is individually twisted. Thus, when the thread assumes a path with at least one curved area on the deposition surface (which can be plane or non-plane), the twist applied to the thread makes it possible to compensate for the fact that the two extreme paths of the thread have different lengths. The extreme paths designate the two paths followed by the thread on both sides of its width, measured parallel to its deposition surface. On the curved area, the axis of rotation of the path of a thread on the deposition surface is normal to the plane tangent to the deposition surface. The application of a twist makes it possible to avoid the undulations observed with the deposition of a non-twisted thread, and this at the scale of the constituting filaments of the thread or of each thread, when the material is created by means of several threads. Advantageously, the composite material is made with a single thread with a twist essentially identical along its entire length or with a group of threads that have an essentially identical twist among themselves and over their entire length. FIG. 2 presents two photos: FIG. 2A shows a preform obtained by deposition of non-twisted threads, while FIG. 2B shows a preform obtained by deposition of twisted threads. In the second case, the preform obtained is more homogeneous and without undulation, given that the twist makes it possible to obtain a homogeneity of the length of the filaments inside the thread.

A thread is generally composed of an assembly of threads or filaments and in general contains 3,000 to 80,000 filaments in the case of carbon threads, and advantageously 12,000 to 24,000 filaments. The reinforcement threads used in the context of the invention are preferably a material selected among carbon, ceramics, glasses, silicas, basalts or aramids, or any other material used in the field of composite materials, with the fibers being natural or synthetic. Carbon is nonetheless particularly preferred. The usable ceramics are silicon carbide and refractory oxides, such as alumina and zirconia. Particularly preferred for use in the context of the invention are carbon threads of 3 to 24K. The constituent fibers can be discontinuous, split, or preferably continuous. The threads used generally have an essentially circular transversal cross-section (qualified as round threads) or, preferably, are essentially parallelepiped or elliptical (qualified as flat threads). These threads have a certain width and thickness. As an example, a flat thread, that is, before application of the twist, of carbon of 3K and of a count of 200 tex of a count of 446 tex, a width of 2 to 5 mm, a flat thread of 12K and a count of 800 tex, a width between 3 and 7 mm, a flat thread of carbon of 24K and a count of 1600 tex, a width of 5 to 12 mm, and a flat thread of carbon of 24K and a count of 1040 tex, a width of 5 to 10 mm. A flat carbon thread of 3,000 to 24,000 filaments will therefore most often have a width of 1 to 12 mm. Among the carbon threads are the High Resistance (HR) threads whose tension modulus is between 220 and 241 GPa and whose tension stress rupture is between 3450 and 4830 MPa, the threads of Intermediate Modulus (IM) whose tension modulus is between 290 and 297 GPa and whose tension stress rupture is between 3450 and 6200 MPa, and the High Modulus (HM) threads whose tension modulus is between 345 and 448 GPa and whose tension stress rupture is between 3450 and 5520 Pa (from "ASM Handbook", ISBN 0-87170-703-9, ASM International 2001).

In terms of the invention, a given twist is applied to the thread before its deposition. Such a twist can, for instance, be obtained by means of a twister. In theory, to avoid filament overlengths, it would be enough to apply a twist of 1 turn to be distributed along the length of the path on which the thread has different extreme paths. In practice, the adhesion of the thread and the reorganization of the filaments inside it during its deposition makes it possible to apply a different twist of one turn per path length.

As an example, a twist of 5 to 100 t/m, preferably of 10 to 80 t/m can be applied. As a specific example, in the case of a thread of carbon of 3K and of a count of 200 tex, a twist of 10 to 70 t/m, preferably of 15 to 40 t/m will be applied; in the case of a thread of carbon of 6K and of 223 tex, a twist of 15 to 80 t/m, preferably of 50 to 70 t/m will be applied, in the case of a thread of carbon of 6K and of 400 tex, a twist of 15 to 80 t/m, preferably of 40 to 60 t/m will be applied, in the case of a thread of carbon of 12K and of 446 tex, a twist of 10 to 80 t/m preferably of 10 to 60 t/m will be applied, and in the case of a thread of carbon of 24K and of 1040 tex, a twist of 10 to 40 t/m, preferably of 10 to 25 t/m will be applied.

The width and the count of the thread correspond either to the supplier data or preferably to the calculated or measured average width of the thread. The minimum radius of the internal path of the thread is determined as follows. Along the entire path of the thread and for each zone in which the path on the deposition surface is not rectilinear, the radius of the internal path $T_1$ of the thread is calculated and the smallest radius obtained for the set of those zones is taken. When a group of threads parallel to each other is deposited, simultaneously or successively, a single and same twist will be preferably applied to each of the threads.

The twist applied will be adjusted by the person skilled in the art as a function of the minimum internal radius (smallest radius used by the internal edges of the thread) and of the maximum external radius (largest radius used by the external edges of the thread) of the thread or threads on the entire composite material to be created, of the spaces left open between two consecutive threads, as well as of the count of the thread and of the surface density of carbon desired. Preferably, the applied twist will be sufficient to minimize, and even totally eliminate the undulations, but the least possible so as to optimize the mechanical performances of the material obtained.

Preferably, the material is obtained with a minimum of threads necessary to minimize the hold points. When several threads are deposited parallel to each other, simultaneously or successively, the same twist will preferably be applied to all the threads constituting the composite material. To determine the twist to be applied, a twist will preferably be applied to the set of threads, necessary to obtain a satisfactory deposit on the path of the thread that has the minimum internal radius of curvature, this twist being necessarily sufficient to obtain a deposit without undulation in the portions of the path where the thread (or the other threads) have a larger internal radius of curvature. Particular attention must be paid to the absence of free space between the threads, and notably to the zones close to their maximum external radius.

The bond of the threads on the deposition surface is achieved by adhesion, thanks to a polymeric binder. No bond is created by sewing or knitting. Polymeric binder is taken to mean a polymeric composition containing a polymer or a mixture of polymers, notably a thermoplastic polymer or a thermosetting system comprising or not a hardener and/or an accelerator. The polymeric binder can be used either in an amount just sufficient to bind the threads to the surface on which they are deposited, or in an amount sufficient to also play the role of matrix in the final composite: the binder then represents from 20 to 60%, preferably from 30 to 40% of the total weight of the fibrous reinforcement (that is, reinforcement threads +polymeric binder). The polymeric binder can notably take the form of a powder, a film, a veil or a thread of bonding hot-melt.

According to a preferred implementation of the invention, the threads used as part of the invention, can be dry before deposition, that is, neither impregnated, nor coated, nor associated with any polymeric binder before entering the twisting devices, nor, preferably, before their deposition. Indeed, advantageously, so as to better control the deposition of the thread, the deposition will be applied on a dry thread. Also, the twisted thread is constituted essentially of fibers or of filaments which represent at least 98% of its weight, the weight percentage of standard lubrication representing at most 2% of the weight of the thread. In this case, the polymeric binder is, for instance, applied on the deposition surface, either before the deposition, or as the deposition proceeds. The deposition surface can therefore be covered with a film, a veil or a powder of polymeric binder.

According to one implementation of the invention, the polymeric binder used is a thermoplastic powder, or a thermosetting powder, or even a mixture of the two. Among the usable thermoplastic powders, it is possible to cite as non-limiting examples the powders of polyolefin, of polyamide, of Polyethersulfone (PES), of poly(phenylene sulfide) (PPS), PolyEtherEtherKetone (PEEK), or Polyetherimide (PEI), while among the thermosetting powders, it is possible to cite as non-limiting examples, the powders of epoxide polymers with or without hardening agent, the phenolic powders, the polyester powders. The process then stipulates the assurance of heating for time deposition zone of the reinforcement thread. This heating can be achieved either at the point of deposition of the reinforcement thread with a resistance heater integrated in the deposition device of the thread, or by means of a heat radiation source directed toward the zone of deposition of the reinforcement thread.

According to the invention, there can equally be implemented a temporary support surface covered beforehand, at least in part, by a polymeric binder selected among the thermoplastic and thermosetting powders, possibly as a mix, the self-adhesive binders or the hot-melt binders, the thermoplastic and thermosetting veils, possibly as a mix, requiring a thermal activation.

According to another characteristic of the invention, there can be implemented as a binder, an adhesive of the same chemical nature as the powders above, used in the molten form, called "hot-melt". This hot-melt resin is then deposited on the support, either during the deposition procedure of the reinforcement thread and before the deposition of the reinforcement thread, or during a previous step.

According to another characteristic of the invention, there is implemented as polymeric binder a solution or a pulverizable emulsion of at least one adhesive resin, such as, for instance but not exclusively, a polyacrylic, polyvinylic or polyurethane resin.

According to another characteristic of the invention nonetheless not preferred, it is possible to associate the thread to the polymeric binder before its deposition. This can be achieved by the implementation of a thermoplastic thread covering the reinforcement thread which is heated at its point of deposition. The thermoplastic thread can be of any appropriate nature and, for instance but not exclusively, include a thread of Polyamide, Polyolefin, Polyethersulfone (PES), Polyetheretherketone (PEEK), Poly(phenylene sulfide) (PPS), or Polyetherimide (PEI). It is equally possible to implement a polymeric binder, closely bound to the reinforcement thread to form a hybrid reinforcement thread. It is thus possible to use as polymeric binder, filaments of thermoplastic or thermosetting materials, of the phenoxy family for instance, of the same nature as the thermoplastic threads above, which will be mixtures of the filaments of reinforcement material, which mixture will be spun to form a hybrid reinforcement thread.

The material according to the invention has little thickness, its thickness corresponding to that of the twisted thread (or threads) that constitute it.

According to the invention, the reinforcement thread is preferably, deposited continuously or, on the contrary, in discontinuous segments. It is useful, for instance in the case of the deposition of a spiral thread, to deposit the thread in a continuous manner on the maximum length of the thread, so as to minimize, and even avoid the cutting points. According to an example of implementation, a thread is deposited so as to form a spiral of twisted threads, each turn being deposited edge to edge with the next. Such an example of implementation where the composite material is in the form of a disc, is for instance, schematically illustrated FIG. 4. Such composite materials can be obtained by deposition of twisted threads on a non-plane surface, or preferably, on a plane surface.

Figure 3:
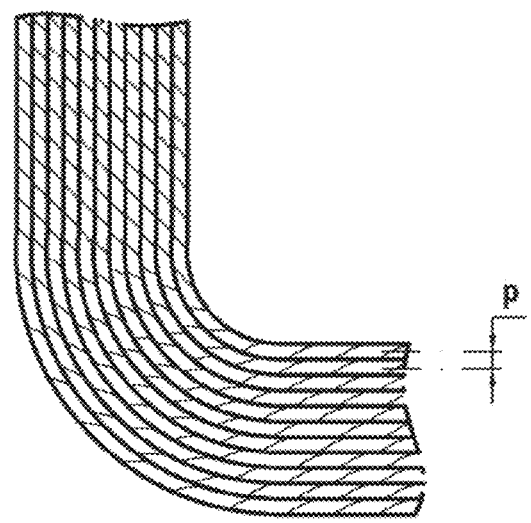
FIGS. 3 and 4 represent schematic views of the top of plies of a web of twisted threads.

In the case of implementation of a composite material with one rectilinear portion and one portion known as corner portion, in the form of a curved ribbon, where the threads are deposited along an arc of a circle portion as shown in FIG. 2B or 3, it can be useful to deposit simultaneously a group of parallel threads, so as to cover in a single step the width of the desired preform.

In order to be able to give the thread the desired path with precision and that it is retained after its deposition, the latter will be fed, without tension or with a minimum of tension up to the point of deposition, so that it will be deposited in state of rest.

According to the invention, as a function of the nature of the reinforcement thread and of the polymeric binder used, there will be applied on the reinforcement thread during its deposition, a pressure between 0.01 bar and 30 bar and preferably between 0.1 bar and 1 bar. Similarly, depending on the nature of the polymeric binder used and of the reinforcement thread and more particularly, in case a thermoplastic or thermo-adhesive polymeric binder is being used, the point of deposition of the reinforcement thread will be heated to a temperature between 50° C. and 450° C. and, preferably, between 50° C. and 150° C.

The following examples make it possible to illustrate the invention.

EXAMPLE 1

Figure 4:
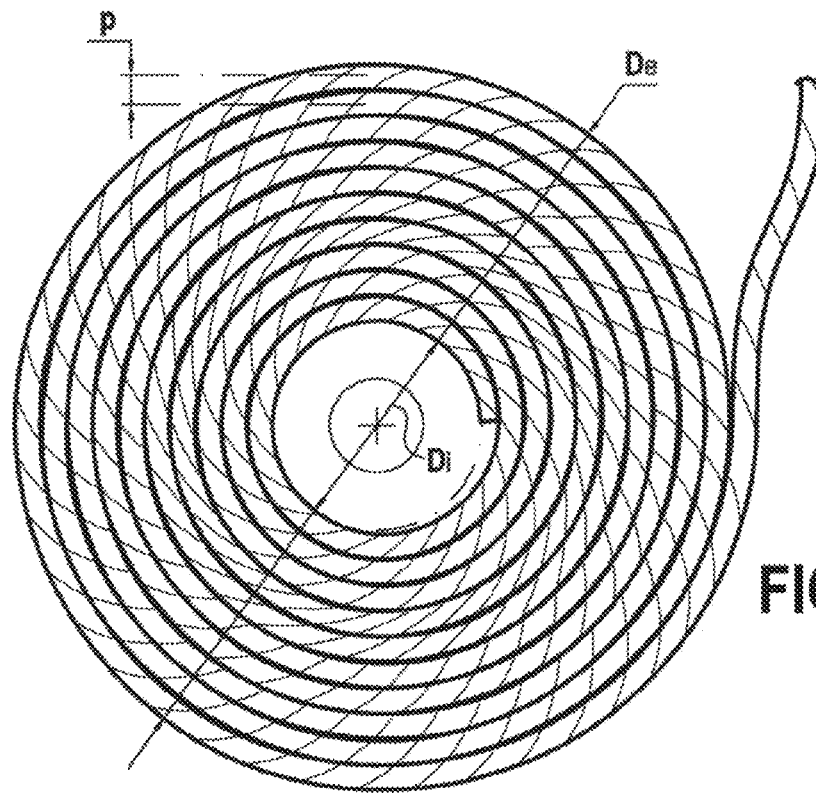
Figure 5:
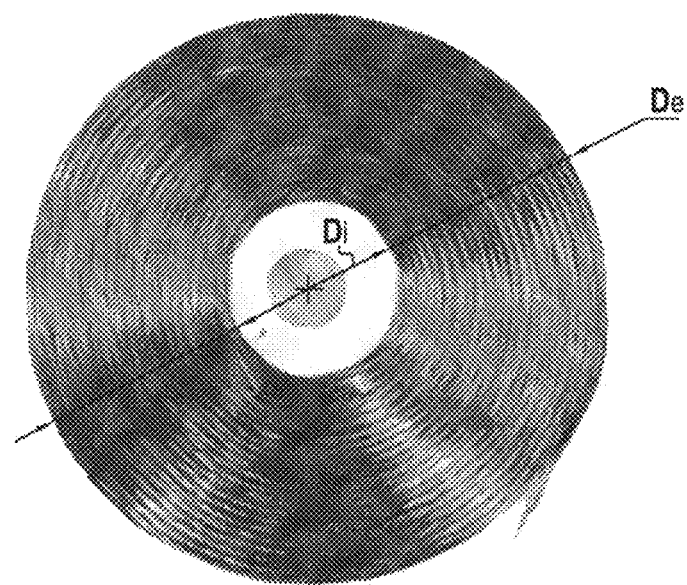
FIGS. 5 and 7 are photographs of composite materials according to the invention, in the form of a disc similar to the one shown in FIG. 4.

A spiral, such as represented on the schematic of FIG. 4 or on the photo of FIG. 5, with an internal diameter $D_i$ of 15 mm and an external diameter $D_e$ is created by deposition of a 3K carbon thread of 200 tex (HTA 5131 of the company Tenax) twisted with a twist of 50 t/m. The deposition spacing p between 2 consecutive average paths is of 0.98 mm. The thread is deposited according to a spiral on silicon paper powdered at 15 g/m$^2$ with an epoxy resin containing a hardener (7 P160 of the company Akzo Nobel). The preform obtained has a thickness of 0.2 mm.

Figure 6:
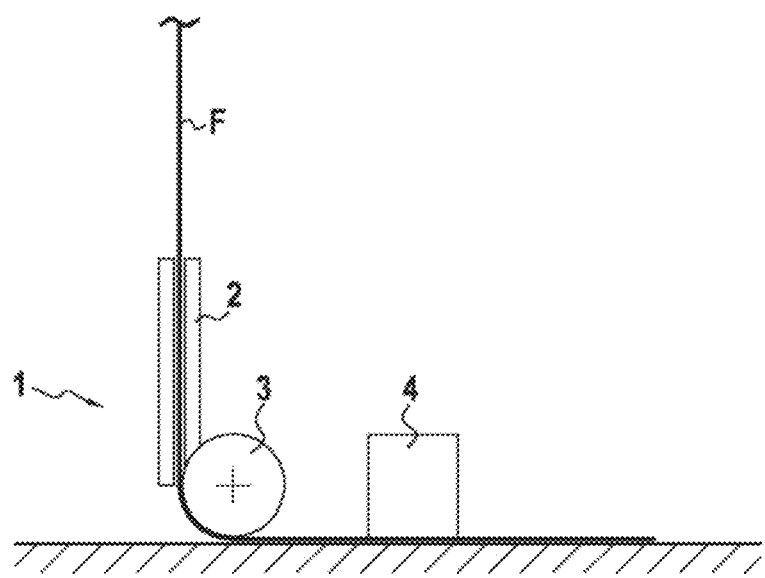
FIG. 6 represents a schematic of a deposition device for a web of twisted threads.

The device shown in FIG. 6 is prepared. The thread F is fed, without tension at the deposition finger 1 which has an integrated resistance heater 2 at a temperature of 300° C. The thread is applied on the surface by means of an applicator roller 3 with a radius of 2 mm and with a contact pressure of 10 KPa. The moving speed of the thread is synchronized with the advancing speed of the deposition finger which is 20 mm/s. Before the point of deposition, a cooling element 4 is applied on the thread so as to apply to it a pressure of 10 KPa.

Figure 7:
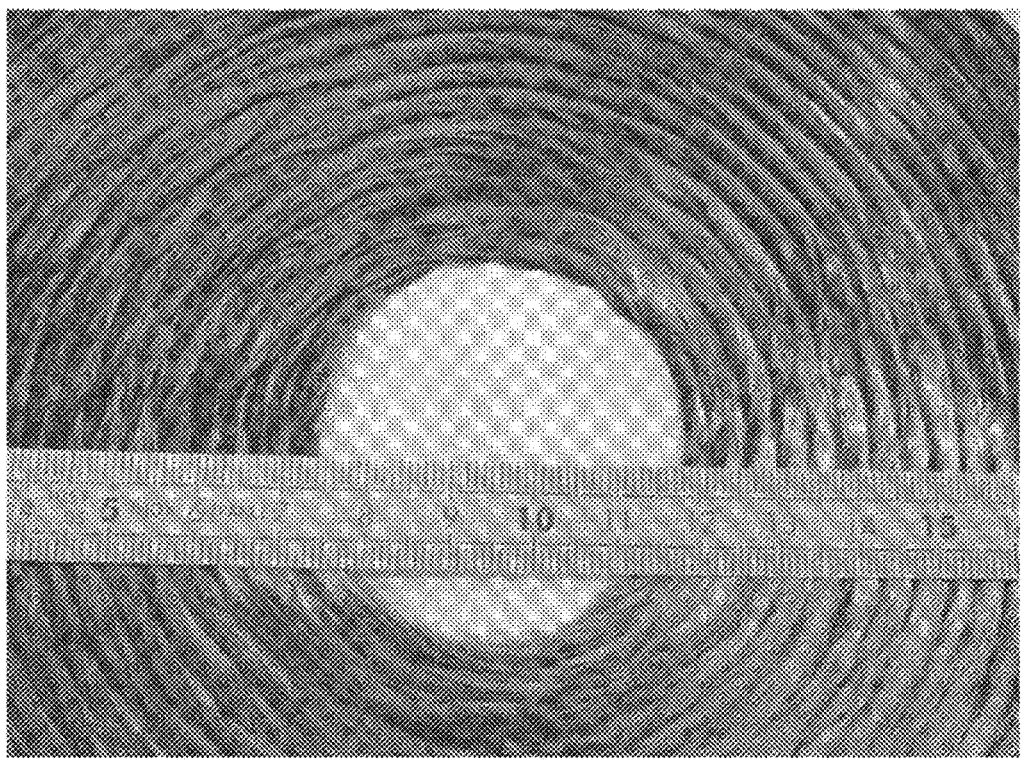

Similarly, a spiral such as shown in the schematic of FIG. 4 and partially shown in the photograph of FIG. 7, with an internal diameter Di of 40 mm and an external diameter De is created by deposition of a 24K carbon thread of 1040 tex (T800S of the company Toray) twisted with a twist of 22 t/m. The deposition spacing p between 2 consecutive average paths is 3.88 mm. The thread is deposited according to a spiral on a film of epoxy resin (Hexply M21, of the company Hexcel) with a surface density of 72 g/m$^2$. The preform obtained has an average thickness of 0.25 mm.

EXAMPLE 2

Using a device similar to the preceding one that enables the simultaneous deposition of 23 threads, a preform intended to reinforce a door corner is fabricated as illustrated in schematic FIG. 3: on an angle of 90°, an arc of circle with an internal diameter of 95 mm and external diameter of 475 mm is created by deposition of 12K carbon threads of 446 tex (IM7-6000 of Hexcel) twisted with a twist of 30 t/m. The deposition spacing, space between the median fibers of two consecutive threads, is 1.65 mm. The deposition is created on a film of epoxy resin (Hexply 8552, of the company Hexcel) with a surface density of 72 g/m$^2$.

The preform obtained has an average thickness of 0.25 mm.

What is claimed is:

1. A composite material comprising a twisted reinforcement thread that is located along a spiral curved path on a surface, said spiral curved path having a minimum internal radius and a length, said spiral curved path having multiple turns in which said twisted reinforcement thread is located adjacent to and parallel with itself, said twisted reinforcement thread comprising from 3,000 to 24,000 filaments that are parallel to each other, said reinforcement thread having external edges defining the width of said reinforcement thread and a middle, wherein the width of said reinforcement thread is from 1 to 12 mm and wherein the filaments located along the external edges of said twisted reinforcement thread have been rotated a sufficient number of times around the filaments located in the middle of said twisted reinforcement thread to produce said twisted reinforcement thread which has from 5 to 100 turns per meter of spiral curved path length.

2. A composite material according to claim 1 wherein the twist of said twisted reinforcement thread is the same along the entire length of said spiral curved path.

3. A composite material according to claim 1 wherein said twisted reinforcement thread has from 10 to 80 turns per meter of spiral curved path length.

4. A composite material according to claim 1 wherein said spiral curved path has a minimum internal radius in the range of 10 to 500 mm, said twisted reinforcement thread comprises 3,000 filaments and said reinforcement thread has a twist of from 10 to 70 turns per meter of spiral curved path length.

5. A composite material according to claim 4 wherein said reinforcement thread has a twist of from 15 to 40 turns per meter of spiral curved path length.

6. A composite material according to claim 5 wherein said twisted reinforcement thread comprises carbon filaments and wherein the tex of said twisted reinforcement thread is 200.

7. A composite material according to claim 1 wherein said spiral curved path has a minimum internal radius in the range of 10 to 500 mm, said twisted reinforcement thread comprises 6,000 filaments and said reinforcement thread has a twist of from 20 to 80 turns per meter of spiral curved path length.

8. A composite material according to claim 7 wherein said reinforcement thread has a twist of from 40 to 70 turns per meter of spiral curved path length.

9. A composite material according to claim 8 wherein said twisted reinforcement thread comprises carbon filaments and wherein the tex of said twisted reinforcement thread is 223 or 400.

10. A composite material according to claim 1 wherein said spiral curved path has a minimum internal radius in the range of 10 to 500 mm, said twisted reinforcement thread comprises 12,000 filaments and said reinforcement thread has a twist of from 10 to 80 turns per meter of spiral curved path length.

11. A composite material according to claim 10 wherein said reinforcement thread has a twist of from 10 to 60 turns per meter of spiral curved path length.

12. A composite material according to claim 11 wherein said twisted reinforcement thread comprises carbon filaments and wherein the tex of said twisted reinforcement thread is 446.

13. A composite material according to claim 1 wherein said spiral curved path has a minimum internal radius in the range of 20 to 150 mm, said twisted reinforcement thread comprises 24,000 filaments and said reinforcement thread has a twist of from 10 to 40 turns per meter of spiral curved path length.

14. A composite material according to claim 13 wherein said reinforcement thread has a twist of from 10 to 25 turns per meter of spiral curved path length.

15. A composite material according to claim 14 wherein said twisted reinforcement thread comprises carbon filaments and wherein the tex of said twisted reinforcement thread is 1040.

16. A composite material according to claim 1 wherein a polymeric binder is located on said surface.

17. A composite material according to claim 16 wherein said polymeric binder comprises a thermosetting polymer, a thermoplastic polymer or a mixture of said themosetting polymer and said thermoplastic polymer.

18. A composite material according to claim 1 wherein said polymeric binder is located on said twisted reinforcement thread.

19. A composite material according to claim 1 wherein said twisted reinforcement thread comprises filaments selected from the group consisting of carbon fibers, glass fibers, aramid fibers, silica fibers, ceramic fibers, basalt fibers and mixtures thereof.

\* \* \* \* \*